(12) United States Patent
Shibazaki

(10) Patent No.: US 11,076,136 B2
(45) Date of Patent: Jul. 27, 2021

(54) DISPLAY DEVICE AND METHOD FOR CONTROLLING DISPLAY DEVICE

(71) Applicant: InnoLux Corporation, Miao-Li County (TW)

(72) Inventor: Minoru Shibazaki, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 16/412,428

(22) Filed: May 15, 2019

(65) Prior Publication Data
US 2020/0363679 A1 Nov. 19, 2020

(51) Int. Cl.
*H04N 9/31* (2006.01)
*G02F 1/1335* (2006.01)
*G02F 1/1343* (2006.01)

(52) U.S. Cl.
CPC ......... *H04N 9/3152* (2013.01); *G02F 1/1343* (2013.01); *G02F 1/133526* (2013.01)

(58) Field of Classification Search
CPC ............ G02F 1/133526; G02F 1/1343; H04N 9/3152; H04N 9/3138; H04N 9/317
See application file for complete search history.

(56) References Cited

U.S. PATENT DOCUMENTS

| | | | | |
|---|---|---|---|---|
| 5,504,597 | A * | 4/1996 | Sprague | G02B 3/0056 349/112 |
| 7,232,227 | B2 * | 6/2007 | Yamasaki | G03B 37/04 348/750 |
| 8,333,476 | B2 * | 12/2012 | Ushigome | G03B 21/2033 353/20 |
| 2004/0114250 | A1 * | 6/2004 | Kato | G02B 3/0062 359/626 |
| 2005/0253779 | A1 * | 11/2005 | Feenstra | G02B 3/14 345/6 |
| 2007/0024977 | A1 | 2/2007 | Kawamura | |
| 2009/0046252 | A1 * | 2/2009 | Heym | G09G 3/32 353/13 |
| 2009/0073557 | A1 * | 3/2009 | Ito | G02B 30/27 359/463 |
| 2010/0060809 | A1 * | 3/2010 | Okuda | G03H 1/2294 349/1 |
| 2013/0121026 | A1 * | 5/2013 | Nakai | G02B 6/0078 362/609 |
| 2013/0285885 | A1 | 10/2013 | Nowatzyk et al. | |
| 2015/0029223 | A1 * | 1/2015 | Kaino | G06T 19/006 345/633 |

(Continued)

FOREIGN PATENT DOCUMENTS

CN 104246578 A 12/2014

*Primary Examiner* — Michelle M Iacoletti
*Assistant Examiner* — Magda Cruz
(74) *Attorney, Agent, or Firm* — Winston Hsu

(57) ABSTRACT

A display device and a method for controlling the display device are provided herein. The display device has a light emitting module, a modulating module, and a control circuit. The light emitting module has a plurality of light emitting units. The modulating module is disposed on the light emitting module and has a modulating material layer. The control circuit is electrically connected to the modulating module and configured to switch the display device between a display mode and a projection mode.

19 Claims, 6 Drawing Sheets

(56) References Cited

U.S. PATENT DOCUMENTS

2017/0371225 A1* 12/2017 Wang ................ G02F 1/133606
2018/0299684 A1* 10/2018 Zhang ................... G02F 1/1336
2020/0333662 A1* 10/2020 Hu ....................... G09G 3/2077

* cited by examiner

DISPLAY DEVICE AND METHOD FOR CONTROLLING DISPLAY DEVICE

BACKGROUND OF THE DISCLOSURE

1. Field of the Disclosure

The present disclosure is related to a display device, and more particularly, to a display device having a display mode and a projection mode.

2. Description of the Prior Art

With the flourishing development of the display devices, consumers have high expectations regarding the quality, functionality, or price of such products. However, some difficulties may be encountered through the use of display devices. Accordingly, a display device that improves the quality is needed.

SUMMARY OF THE DISCLOSURE

One embodiment of the present disclosure discloses a method for controlling a display device. The method comprises receiving a switch signal; and switching the display device between a display mode and a projection mode according to the switch signal. A transmitting direction of a light in the projection mode is different from a transmitting direction of the light in the display mode.

Another embodiment of the present disclosure discloses a display device. The display device comprises a light emitting module, a modulating module, and a control circuit. The light emitting module comprises a plurality of light emitting units. The modulating module is disposed on the light emitting module and comprises a modulating material layer. The control circuit is electrically connected to the modulating module and configured to switch the display device between a display mode and a projection mode.

These and other objectives of the present disclosure will no doubt become obvious to those of ordinary skill in the art after reading the following detailed description of the embodiment that is illustrated in the various figures and drawings.

DETAILED DESCRIPTION

In the document, the terms "about" and "substantially" typically mean±20% of the stated value, ±10% of the stated value, ±5% of the stated value, ±3% of the stated value, ±2% of the stated value, ±1% of the stated value, or ±0.5% of the stated value. The stated value of the present disclosure is an approximate value. When there is no specific description, the stated value includes the meaning of "about" or "substantially". Moreover, when considering the deviation or the fluctuation of the manufacturing process, the term "same" may also include the meaning of "about" or "substantially". The material of the layers, thickness of the layers, profile of the layers, structure of a thin-film transistor (TFT), circuit layout and so forth are only for example, and sizes or dimensions or ranges are only for illustrated, the present disclosure is not limited thereto. The expressions such as "a first material layer disposed above/on/over a second material layer", may indicate the direct contact of the first material layer and the second material layer, or it may indicate a non-contact state with one or more intermediate layers between the first material layer and the second material layer. In the above situation, the first material layer may not be in direct contact with the second material layer.

Figure 1:
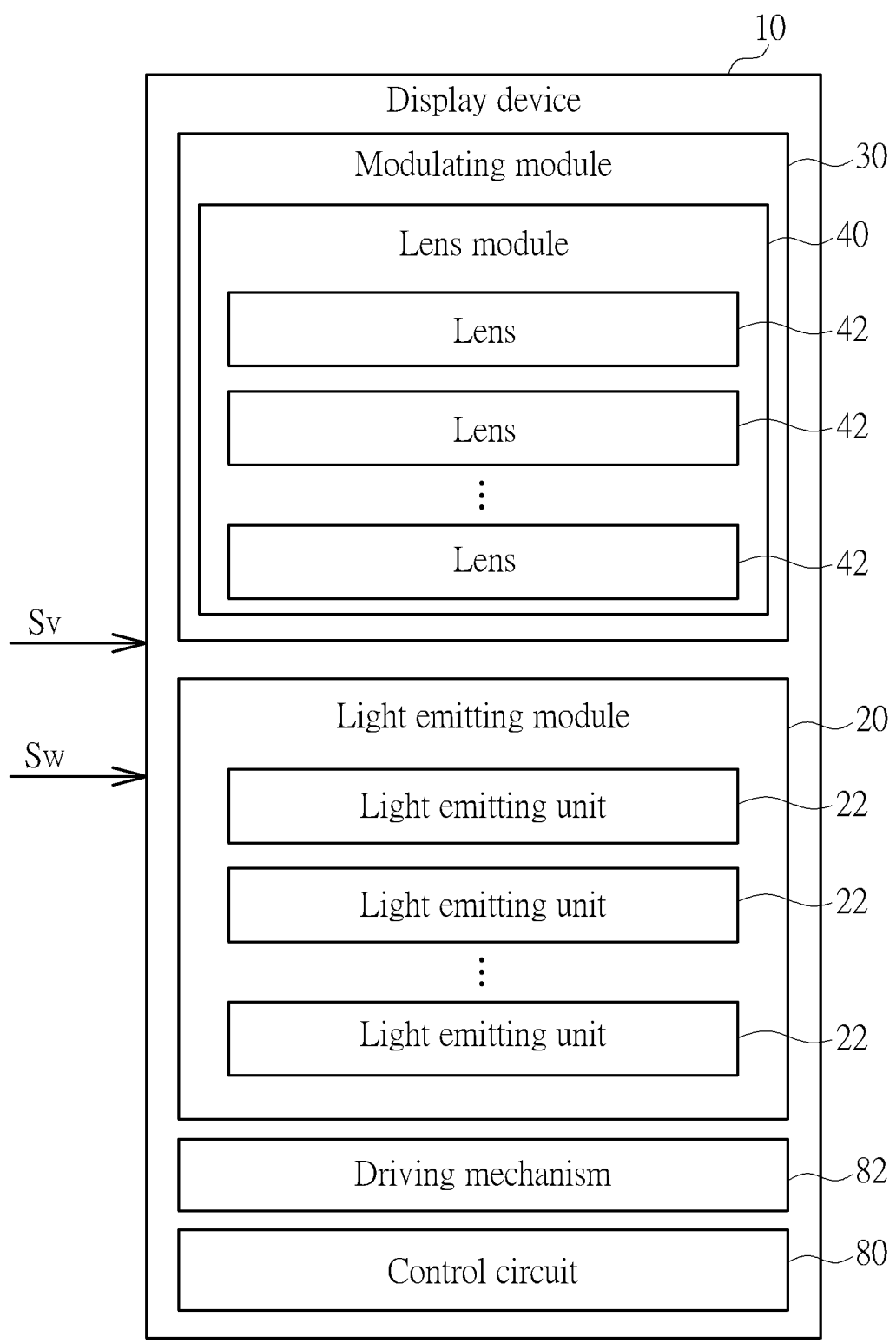
FIG. 1 illustrates a functional diagram of a display according to an embodiment of the present disclosure.
Figure 2:
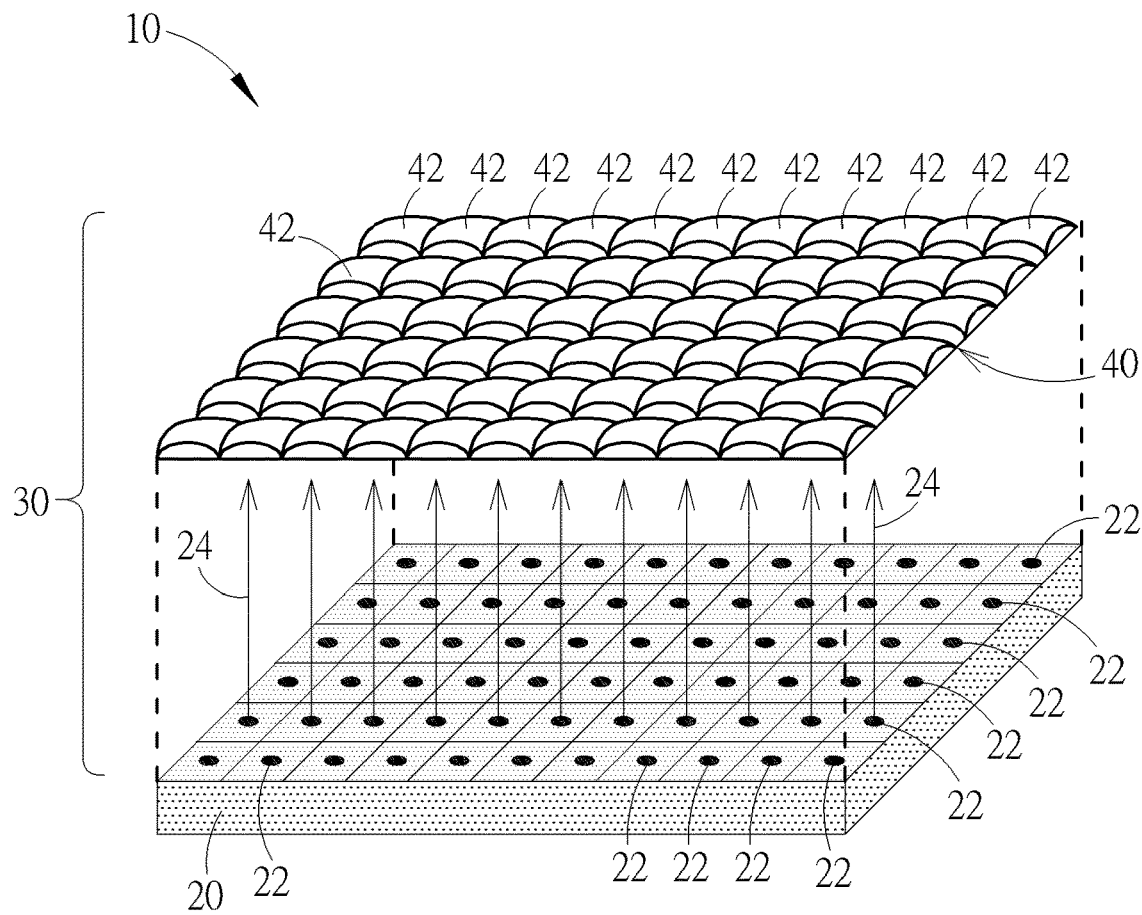
FIG. 2 illustrates a diagram showing a structure of the display shown in FIG. 1.

FIG. 1 illustrates a functional diagram of a display device 10 according to an embodiment of the present disclosure. FIG. 2 illustrates a diagram showing a structure of the display device 10. The display device 10 may include computers, televisions, mobile phones, and personal digital assistants, public information display devices, and automobiles, but not limited thereto. The display device 10 may comprise a light emitting module 20, a modulating module 30, and a control circuit 80. The light emitting module 20 may comprise a plurality of light emitting units 22 for emitting light 24. In some examples, the light emitting units 22 may be the pixels or sub-pixels of the display device 10. The modulating module 30 may comprise a lens module 40 which has a plurality of lenses 42 for redirecting the light 24 emitted from the light emitting units 22. In the embodiment, at least one of lens 42 may be corresponding to a corresponding light emitting unit 22 and may be configured to redirect the light 24 emitted from the corresponding light emitting unit 22. However, the present disclosure is not limited thereto. In some embodiments, at least one of the lenses 42 may be corresponding to a set of light emitting units 22 and may be configured to redirect the light 24 emitted from the set of light emitting units 22. A number of the light emitting units 22 in one set may be greater than 1, such as 2, 3, 4 or 6.

The light emitting units 22 may include liquid crystals (LC), organic light-emitting diodes (OLED), inorganic light-emitting diodes (LED), mini light-emitting diodes (mini LED), micro light-emitting diodes (micro LED), quantum dots (QD), quantum dot light-emitting diodes (QLEDorQDLED), phosphors, fluorescence, other materials, or a combination thereof, and are not limited thereto. The light emitting units 22 may be driven by the control circuit 80, and the control circuit 80 may comprise active components (such as thin-film transistors (TFTs) or an integrated circuit (IC)), passive components or a combination thereof. In addition, the material of a semiconductor layer of the thin-film transistors may comprise amorphous silicon, polysilicon such as low-temp polysilicon (LTPS) or oxide semiconductor such as indium gallium zinc oxide (IGZO). However, the present disclosure is not limited thereto.

Figure 3:
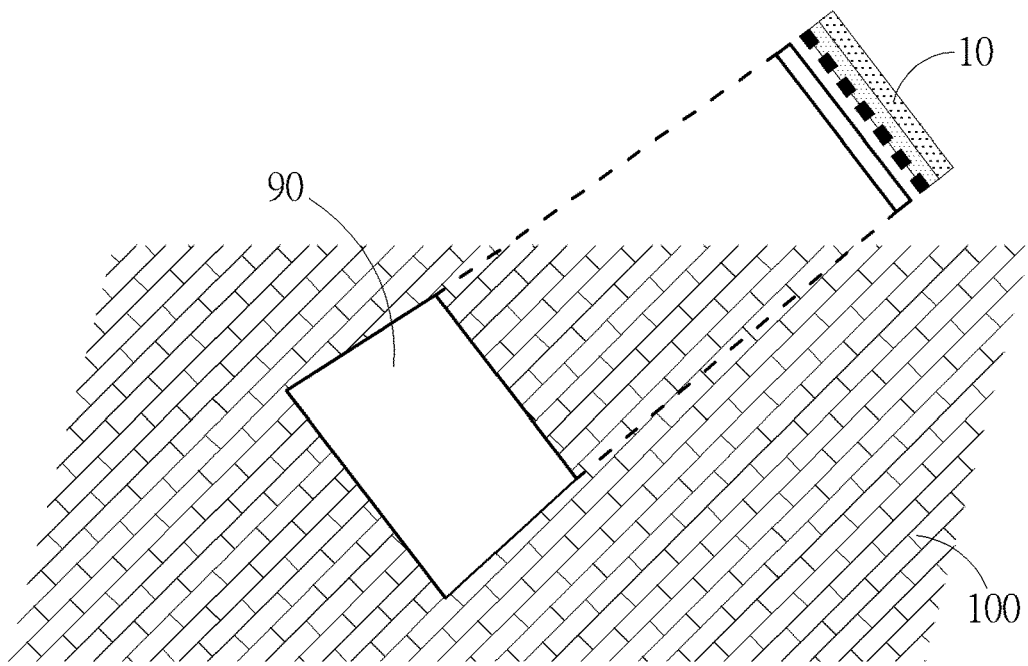
FIG. 3 shows an environment when an area of a surface is illuminated by the display while the display operates in the projection mode.
Figure 4:
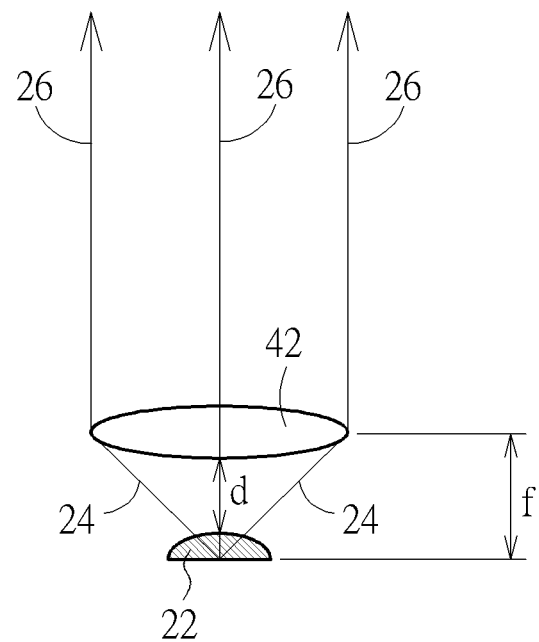
FIG. 4 illustrates a schematic diagram showing light paths of the display when the display operates in the projection mode.
Figure 5:
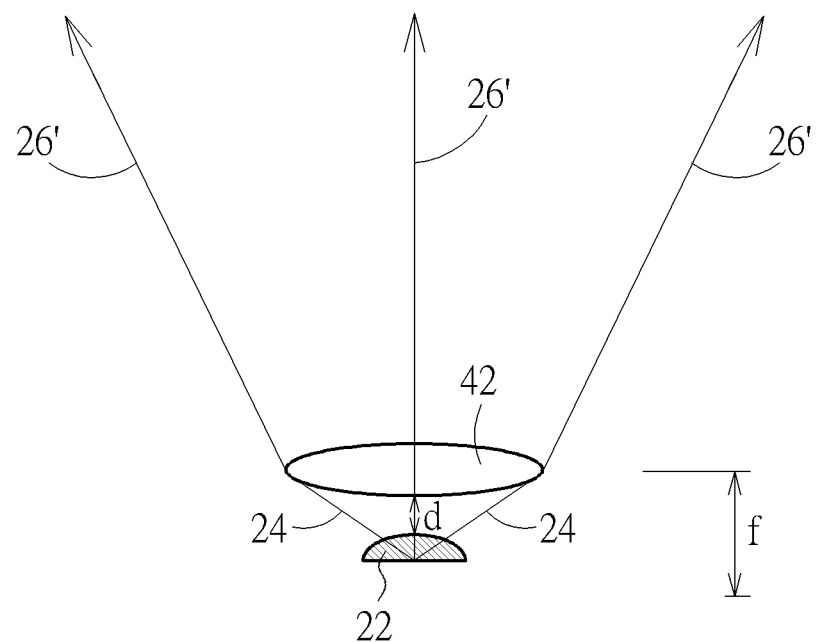
FIGS. 5 and 6 illustrate schematic diagrams respectively showing light paths of the display when the display operates in the display mode.
Figure 6:
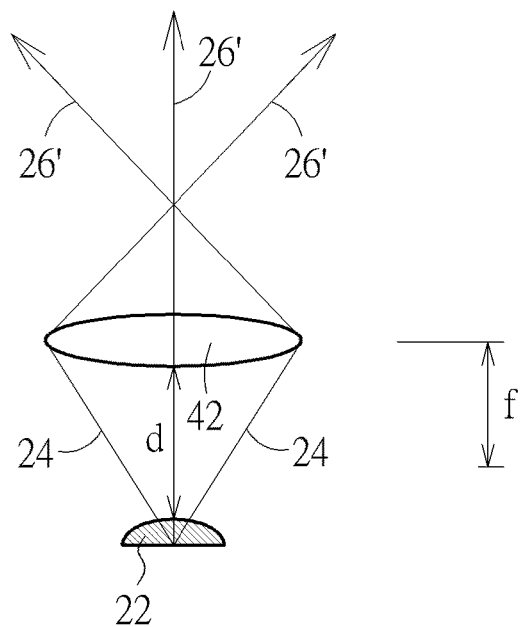

The control circuit 80 may switch an operation mode of the display device 10 according to a switch signal Sw, and the display device 10 may operate in a display mode or in a projection mode. Please refer to FIGS. 2 and 3. FIG. 3 shows a schematic diagram where a region 90 of a surface 100 (e.g. the ground) is illuminated by the display device 10 while the display device 10 operates in the projection mode. In some embodiments, the display device 10 may operate in the display mode different from the projection mode. The lens module 40 may redirect the light 24 emitted from the light emitting units 22, and the transmitting direction of the light 24 emitted from the light emitting units 22 may be different from the transmitting direction of the light 26 having passed through the modulating module 40. The light 24 redirected by the modulating module 30 would be transformed into the light 26 (as shown in FIG. 4) or the light 26' (as shown in FIGS. 5 and 6). In some examples, the parallelism of the light 26 in the projection mode may be greater than the parallelism of the light 26' in the display mode. The transmitting direction of the light 26 in the projection mode may be different from the transmitting direction of the light 26' in the display mode. Accordingly, as shown in FIG. 3, the display device 10 operating in the projection mode may be used as a projector to project an image to a region 90 on the surface 100 or used as a lighting device to illuminate the region 90. In addition, as shown in FIGS. 2, 5 and 6, when the display device 10 operates in the display mode, the light 26' emitted from the modulating module 30 may be divergent, and an image displayed on the display device 10 may be seen from various viewing angles. When the display device 10 operates in the display mode, the control circuit 80 may receive an image signal Sv and drive the light emitting units 22 to display an image according to the image signal Sv. Similarly, when the display device 10 operates in the projection mode, the control circuit 80 may receive the image signal Sv and drive the light emitting units 22 to display an image according to the image signal Sv, and project the image to the region 90.

In an embodiment of the present disclosure, the transmitting direction of the light 26 having passed through the modulating module 30 may be adjusted by adjusting a distance between the light emitting module 20 and the lenses 42. FIG. 4 illustrates a schematic diagram showing light paths of the display device 10 when the display device 10 operates in the projection mode. FIGS. 5 and 6 illustrate schematic diagrams respectively showing light paths of the display device 10 when the display device 10 operates in the display mode. As shown in FIG. 4, when the display device 10 operates in the projection mode, the distance d between the light emitting unit 22 and the lens 42 (i.e., the distance d between the light emitting module 20 and the lens module 40) may be substantially equal to a focal length f of the lenses 42, and transmitting directions of the light 26 having passed through the modulating module 30 may be substantially parallel. In some examples, the distance d may be the smallest distance between the light emitting unit 22 and the corresponding lens 42, but not limited thereto. The focal length f in FIGS. 4-6 may be only for exemplary illustration, and the actual focal length f may be measured by optical instruments. In the embodiment, the focal length f of the lens 42 may be substantially equal to a constant. Additionally, when the display device 10 operates in the display mode, the distance d between the light emitting unit 22 and the lens 42 may be less than the focal length f of the lens 42 (as shown in FIG. 5) or greater than the focal length f of the lens 42 (as shown in FIG. 6), and the light 26' having passed through the modulating module 30 may be divergent. Therefore, by adjusting the distance d between the light emitting module 20 and the lens module 40, the transmitting direction of the light 26 or 26' having passed through the modulating module 30 may be adjusted. In an embodiment of the present disclosure, as shown in FIG. 1, the display device 10 may further comprise a driving mechanism 82 to drive the lens module 40 to adjust the distance d between the light emitting units 22 and the lenses 42 to switch the display device 10 between the display mode and the projection mode.

Figure 7:
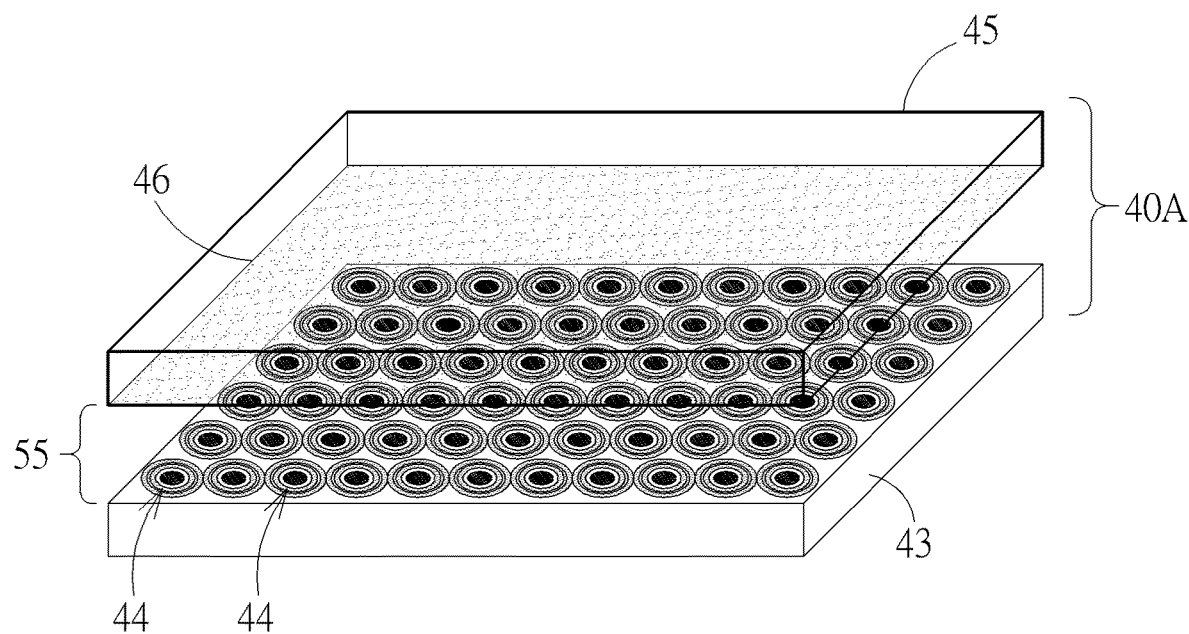
FIG. 7 shows a schematic diagram of a lens module according to an embodiment of the present disclosure.
Figure 8:
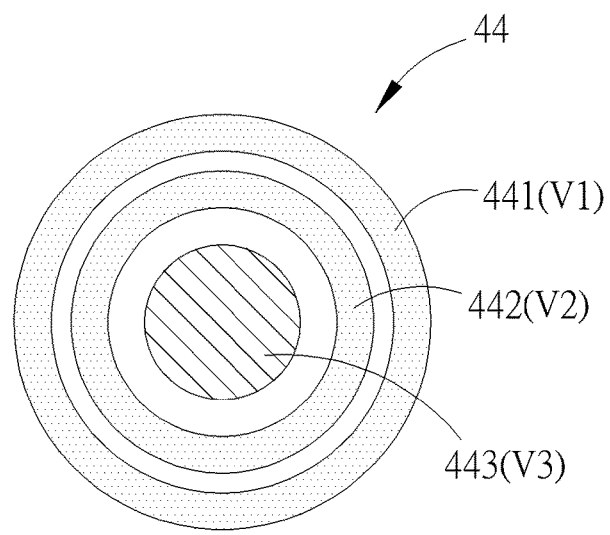
FIG. 8 shows a schematic diagram of a first electrode shown in FIG. 7.

In some embodiments of the present disclosure, a modulating material layer may be disposed in the modulating module 30, and the transmitting direction of the light 26 emitted from the modulating module 30 may be adjusted by adjusting the refractive index of the modulating material layer. In an embodiment of the present disclosure, the material of the modulating material layer may include liquid crystal. The lenses 42 of the lens module 40 may include liquid crystal (LC) lenses. FIG. 7 shows a schematic diagram of a lens module 40A according to an embodiment of the present disclosure. FIG. 8 shows a top view of a first electrode 44 shown in FIG. 7. The lens module 40A may be an adjustable lens module, such as a liquid crystal (LC) lens module. Similar to the lens module 40, the lens module 40A may be used to redirect the light 24 emitted from the light emitting units 22. The lens module 40A may comprise a first substrate 43 and a second substrate 45. The first substrate 43 and the second substrate 45 may be transparent and allow light to pass through. A modulating material layer 55 may be disposed between the first substrate 43 and the second substrate 45. The modulating material layer 55 may include a liquid crystal layer, but not limited thereto. The lens module 40A may further comprise a plurality of first electrodes 44 and a second electrode 46. In the embodiment, the first electrodes 44 may be formed on the first substrate 43, and the second electrode 46 may be formed on the second substrate 45. In another embodiment, the first electrodes 44 may be formed on the second substrate 45, and the second electrode 46 may be formed on the first substrate 43. The material(s) of the first electrodes 44 and the second electrode 46 may include a transparent conductive material, such as indium tin oxide (ITO). The refractive index of the modulating material layer 55 could be adjusted by the control circuit 80 while the control circuit 80 adjusts a voltage difference between the first electrode 44 and the second electrode 46. In some embodiments, when a voltage is applied to the lens module 40A, the lens module 40A may act like a lens array (e.g., the lens module 40 having the lenses 42) to redirect the light 24 emitted from the light emitting units 22, and the display device 10 may operate in the projection mode, but not limited thereto. In other examples, the display device 10 may operate in the projection mode when no voltage applied to the lens module 40A, and it may depend on the type of the lens module 40A. In some embodiments, when no voltage is applied to the lens module 40A, the lens module 40A would not redirect the light 24, and the display device 10 may operate in the display mode, but not limited thereto, and it may depend on the type of the lens module 40A.

In an embodiment of the present disclosure, at least one of the first electrodes 44 may comprise first sub-electrodes 441 to 443, and the second electrode 46 may be a plane conductive layer and used as a common electrode applied with a common voltage (e.g., a ground voltage), but not limited thereto. The sub-electrodes 441, 442 and 443 may be applied with different voltages V1, V2 and V3, which are different from the common voltage applied to the second electrode 46. In an embodiment of the present disclosure, the voltage V1 is less than the voltages V2 and V3, and the voltage V2 is less than the voltage V3. However, the present disclosure is not limited thereto, and the applied voltages V1, V2 and V3 may be adjusted based on the design of the lens module 40A. In the embodiment, at least one of the first electrodes 44 may be corresponding to a light emitting unit 22. In another embodiment, at least one of the first electrodes 44 may be corresponding to a set of light emitting units 22 and is configured to redirect the light 24 emitted from the set of light emitting units 22. A number of the light emitting units 22 of the set may be greater than 1, such as 2, 3, 4, or 6. In the embodiment, the first electrode 44, the second electrode 46 and the modulating material layer 55 disposed between first electrode 44 and the second electrode 46 may operate together to be one of the lenses 42 of the modulating module 30 as shown in FIGS. 1 to 2.

Figure 9:
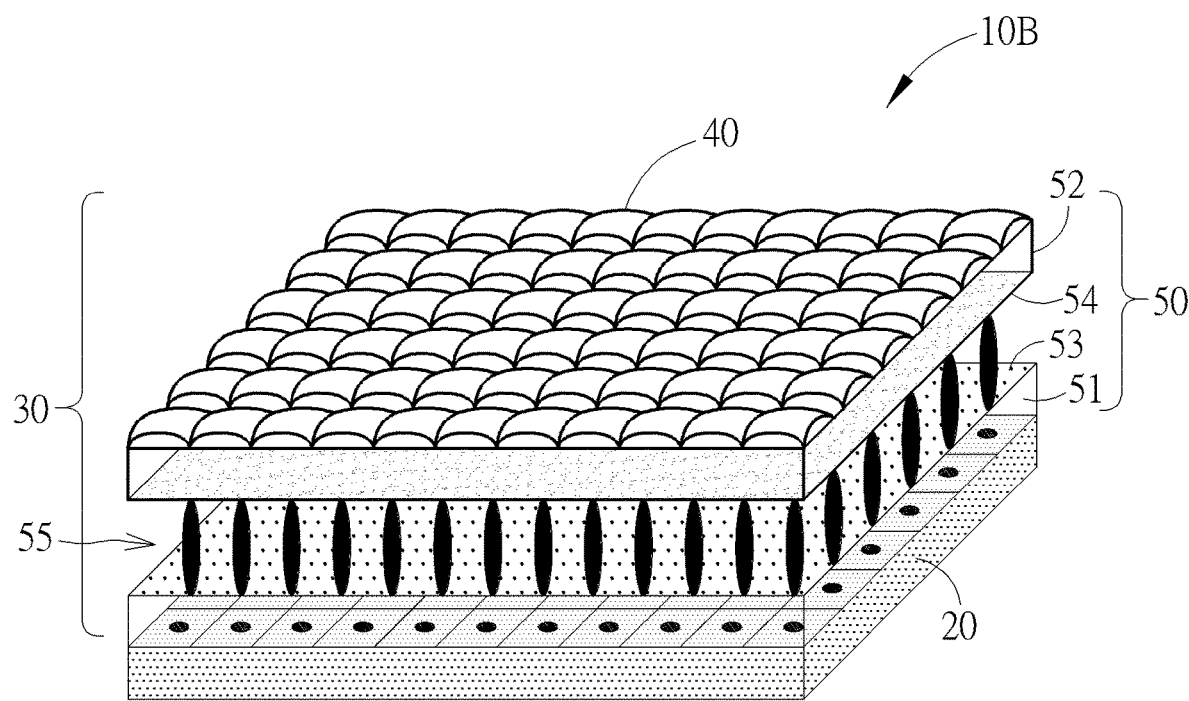
FIG. 9 illustrates a diagram showing a structure of another display according to an embodiment of the present disclosure.

FIG. 9 illustrates a diagram showing a structure of the display device 10B according to an embodiment of the present disclosure. The display device 10B is similar to the display device 10, and the main difference between the two display devices 10 and 10B is that the display device 10B further comprises a modulating layer 50. The modulating layer 50 may be disposed between the light emitting module 20 and the lens module 40. The modulating layer 50 may comprise a first substrate 51, a second substrate 52, a first electrode 53, a second electrode 54, and the modulating material layer 55. The first substrate 51 may be disposed between the light emitting module 20 and the modulating material layer 55, and the second substrate 52 may be disposed between the modulating material layer 55 and the lens module 40. The first electrode 53 and the second electrode 54 may be disposed between the first substrate 51 and the second substrate 52. For example, the first electrode 53 may be disposed on the first substrate 51, and the second electrode 54 may be disposed on the second substrate 52. The refractive index of the modulating material layer 55 may be adjusted by adjusting a voltage difference between the first electrode 53 and the second electrode 54. In some embodiments, at least one of the first electrode 53 and the second electrode 54 may be patterned into a plurality of regions (not shown), and the regions may be individually controlled (e.g. applying different voltages) to have different properties. If it is assumed that the refractive index of the modulating material layer 55 is n1 when there is no voltage difference between the first substrate 51 and the second substrate 52, and that the refractive index of the modulating material layer 55 may be n2 when a voltage difference exists between the first substrate 51 and the second substrate 52. A product of the refractive index n1 and the distance d between the light emitting module 20 and the lenses 42 may be substantially equal to the focal length f of the lenses 42 (i.e., n1×d=f), and a product of the refractive index n2 and the distance d between the light emitting module 20 and the lenses 42 may be greater or less than the focal length f of the lenses 42 (i.e., n2×d>f or n2×d<f). Accordingly, the display device 10B would be switched between the display mode (i.e., n2×d>f or n×xd<f) and the projection mode (i.e., n1×d=f) by adjusting the voltage difference between the first substrate 51 and the second substrate 52. In the embodiment, the distance d between the light emitting module 20 and the lenses 42 may be substantially equal to a constant. However, the present disclosure is not limited thereto. For example, in another embodiment, both the distance d between the light emitting module 20 and the lenses 42 and the voltage difference between the first substrate 51 and the second substrate 52 are adjustable.

Figure 10:
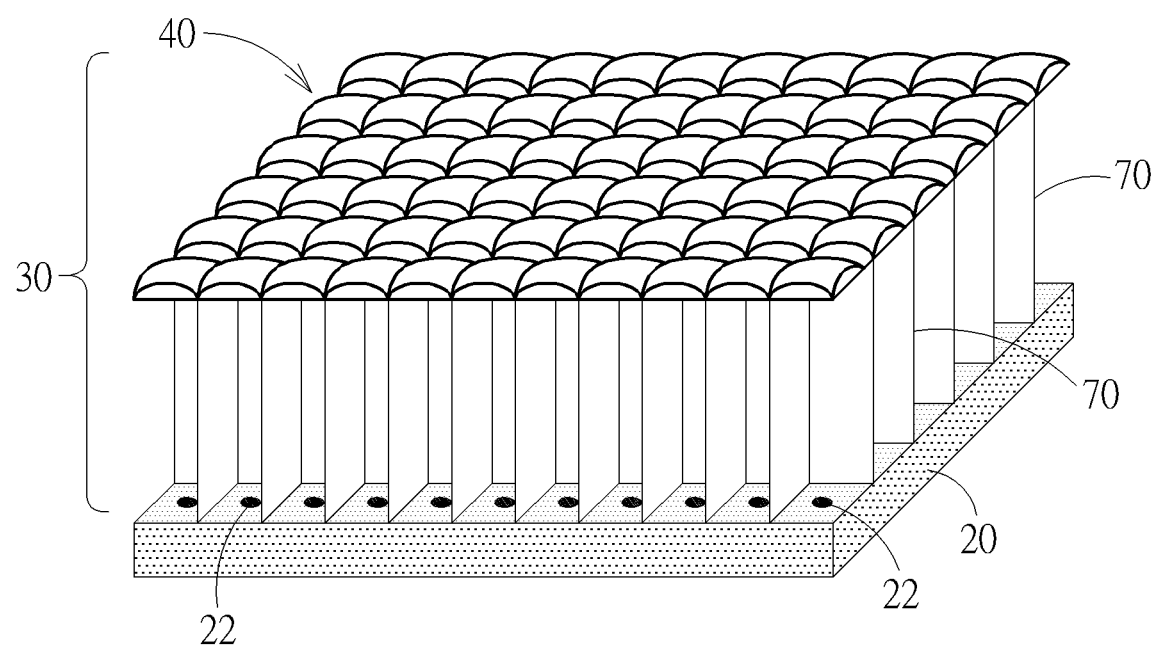
FIG. 10 illustrates a diagram showing a structure of another display according to an embodiment of the present disclosure.

FIG. 10 illustrates a diagram showing a structure of another display device according to an embodiment of the present disclosure. In the embodiment, the modulating module 30 of the display device may further comprise a plurality of spacing components 70 disposed between the light emitting module 20 and the lens module 40, and at least one of the spacing components 70 may be disposed between two adjacent light emitting units 22. Due to the spacing components 70, the light emitted from one light emitting unit 22 may decrease degree of mixing with the light emitted from neighboring light emitting units 22. Accordingly, the image quality of the display may be improved.

In summary, the method for controlling the display can switch the display device between the display mode and the projection mode by adjusting a distance between the light emitting module and the lenses or by adjusting the refractive index of a modulating layer disposed in the modulating module. In the display mode, the display device may display images. In the projection mode, the display device may be used as a projector or a lighting device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, each of the claims constitutes an individual embodiment, and the scope of the disclosure also includes the scope of the various claims and combinations of the embodiments. The scope of the disclosure is subject to the definition of the scope of the claims.

What is claimed is:

1. A method for controlling a display device, the display device comprising:
   a light emitting module comprising a plurality of light emitting units; and
   a plurality of lenses disposed on the light emitting module;
   the method comprising:
   receiving a switch signal; and
   switching the display device between a display mode and a projection mode by adjusting a distance between the light emitting module and the plurality of lenses according to the switch signal;
   wherein a transmitting direction of a light in the projection mode is different from a transmitting direction of the light in the display mode.

2. The method of claim 1, wherein the plurality of lenses comprise:
 a plurality of first electrodes;
 a second electrode; and
 a modulating layer disposed between the plurality of first electrodes and the second electrode.

3. The method of claim 1, wherein at least one of the plurality of lenses is corresponding to a corresponding light emitting unit and is configured to redirect light emitted from the corresponding light emitting unit.

4. The method of claim 1, wherein at least one of the plurality of lenses is corresponding to a set of light emitting units and is configured to redirect light emitted from the set of light emitting units.

5. The method of claim 1, wherein the display device further comprises a plurality of spacing components disposed between the light emitting module and the plurality of lenses, and at least one of the plurality of spacing components is disposed between two adjacent ones of the plurality of light emitting units.

6. A method for controlling a display device, the display device comprising:
 a light emitting module comprising a plurality of light emitting units for emitting light; and
 a modulating module, disposed on the light emitting module and for redirecting the light, the modulating module comprising a modulating material layer;
 the method comprising:
 receiving a switch signal; and
 switching the display device between a display mode and a projection mode by adjusting a refractive index of the modulating material layer according to the switch signal;
 wherein a transmitting direction of a light in the projection mode is different from a transmitting direction of the light in the display mode.

7. The method of claim 6, wherein the modulating module further comprises a plurality of lenses disposed on the modulating material layer.

8. The method of claim 6, wherein the modulating module comprises a lens module comprising a first electrode and a second electrode, the modulating material layer is disposed between the first electrode and the second electrode, and the refractive index of the modulating material layer is adjusted by adjusting a voltage difference between the first electrode and the second electrode.

9. The method of claim 6, wherein the modulating material layer is disposed between the light emitting module and a plurality of lenses, the refractive index of the modulating material layer is adjusted by adjusting a voltage difference between a first electrode and a second electrode of the display device, a first substrate is disposed between the light emitting module and the modulating material layer, and a second substrate is disposed between the modulating material layer and the plurality of lenses.

10. The method of claim 6, wherein the modulating material layer is a liquid crystal layer.

11. A display device, comprising:
 a light emitting module, comprising a plurality of light emitting units for emitting light;
 a modulating module, disposed on the light emitting module and for redirecting the light, the modulating module comprising a modulating material layer; and
 a control circuit, electrically connected to the modulating module and configured to switch the display device between a display mode and a projection mode by adjusting a refractive index of the modulating material layer according to the switch signal.

12. The display device of claim 11, wherein a transmitting direction of a light in the projection mode is different from a transmitting direction of the light in the display mode.

13. The display device of claim 11, wherein the modulating module further comprises a first electrode and a second electrode, the modulating material layer is disposed between the first electrode and the second electrode, and the control circuit adjusts a voltage difference between the first electrode and the second electrode to adjust the refractive index of the modulating material layer.

14. The display device of claim 11, wherein the modulating module further comprises the plurality of lenses disposed on the modulating material layer.

15. The display device of claim 14, wherein the modulating module further comprises a lens module, the lens module comprises a first electrode and a second electrode, and the modulating material layer is disposed between the first electrode and the second electrode.

16. The display device of claim 14, wherein at least one of the plurality of lenses is corresponding to a corresponding light emitting unit and is configured to redirect light emitted from the corresponding light emitting unit.

17. The display device of claim 14, wherein at least one of the plurality of lenses is corresponding to a set of light emitting units and is configured to redirect light emitted from the set of light emitting units.

18. The display device of claim 11, wherein the modulating material layer is a liquid crystal layer.

19. The display device of claim 11, wherein the modulating module further comprises a plurality of spacing components disposed between the light emitting module and the modulating module, and at least one of the plurality of spacing components is disposed between two adjacent ones of the plurality of light emitting units.

* * * * *